United States Patent
Ono

(10) Patent No.: US 7,188,861 B2
(45) Date of Patent: Mar. 13, 2007

(54) COVER STRUCTURE FOR AIR BAG DEVICE

(75) Inventor: Kazumi Ono, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 56 days.

(21) Appl. No.: 10/401,025

(22) Filed: Mar. 28, 2003

(65) Prior Publication Data

US 2003/0218318 A1  Nov. 27, 2003

(30) Foreign Application Priority Data

Mar. 29, 2002  (JP) ............................ 2002-097842
Mar. 25, 2003  (JP) ............................ 2003-083818

(51) Int. Cl.
   *B60R 21/20* (2006.01)
(52) U.S. Cl. ................................... 280/728.3; 280/732
(58) Field of Classification Search ............ 280/728.3, 280/730.1, 731, 732
   See application file for complete search history.

(56) References Cited

U.S. PATENT DOCUMENTS

| 5,523,532 A | | 6/1996 | Leonelli et al. | |
| 5,961,143 A | * | 10/1999 | Hlywka et al. | 280/728.3 |
| 6,050,595 A | * | 4/2000 | Knox | 280/728.3 |
| 6,131,945 A | * | 10/2000 | Labrie et al. | 280/728.3 |
| 6,203,056 B1 | * | 3/2001 | Labrie et al. | 280/728.3 |
| 6,205,056 B1 | * | 3/2001 | Pan et al. | 365/185.2 |
| 6,294,124 B1 | * | 9/2001 | Bauer et al. | 264/400 |
| 6,322,101 B1 | * | 11/2001 | Suizu et al. | 280/732 |
| 6,328,367 B1 | * | 12/2001 | Eichhorn et al. | 296/70 |
| 6,457,738 B1 | * | 10/2002 | Labrie et al. | 280/728.3 |
| 6,460,876 B1 | * | 10/2002 | Nishijima | 280/728.3 |
| 6,524,505 B1 | * | 2/2003 | Bisognin et al. | 264/154 |
| 6,533,312 B1 | * | 3/2003 | Labrie et al. | 280/728.2 |
| 6,612,613 B1 | * | 9/2003 | Hodges | 280/732 |
| 6,616,182 B2 | * | 9/2003 | Woolley et al. | 280/732 |

FOREIGN PATENT DOCUMENTS

| EP | 0 428 935 A2 | 5/1991 |
| EP | 1 151 898 A1 | 11/2001 |
| FR | 2 796 610 A1 | 1/2001 |
| JP | 2000-168401 A | 6/2000 |
| JP | 2001-219805 A | 8/2001 |

* cited by examiner

*Primary Examiner*—Paul N. Dickson
*Assistant Examiner*—Toan C. To
(74) *Attorney, Agent, or Firm*—Foley & Lardner LLP

(57) ABSTRACT

A cover structure for an air bag device comprises a cover including a first member having a plane-like portion and a second member having a vertical portion connected through a curved part with the plane-like portion at an angle, and a rupturable groove formed on a surface of the cover opposite to an air bag in the air bag device to rupture in response to inflation of the air bag and to form an opening for causing the air bag to expose.

The rupturable groove is formed throughout the first and second members in such a manner that it extends to coincide substantially with a direction of shearing force applied on the cover when the rupturable groove is ruptured.

26 Claims, 12 Drawing Sheets

COVER STRUCTURE FOR AIR BAG DEVICE

BACKGROUND OF THE INVENTION

1. Field of the Invention

The present invention relates to a cover structure for an air bag device used in a vehicle such as an automobile, more specifically to a cover structure in which a portion of a cover is ruptured to form an opening for exposing an air bag when the air bag is inflated.

2. Description of the Prior Art

Conventionally, there is known a cover structure having a rupturable (tearable) cover as an air bag device, which is provided in an instrument panel installed in a vehicle such as an automobile, as disclosed in Japanese Patent Laid-Open 2001-219805 or Japanese Patent Laid-Open 2000-168401.

In the conventional cover structure, when the air bag is inflated, a rupturable groove formed on a back surface of the instrument panel 300 as the cover, opposite to the air bag device is ruptured and opened to expose an air bag in the air bag device, as shown in FIG. 13.

A portion surrounded by the rupturable groove is formed as a lid 302.

The instrument panel 300 includes a first member 303 having an upper plan or plane-like portion 303b, a lower second member 304 having a vertical portion connected with the first member at a perpendicular angle.

Usually, a backward end 303a of the first member and a forward end 304a of the second member are connected by use of a curved part 305 having a small curvature.

The rupturable groove 301 includes a first groove part 301a extending rightward and leftward, and second groove parts 301b, 301b disposed in right and left sides of the lid for extending forwardly and backwardly of the vehicle. Corners 301c, 301c for connecting the first and second groove parts are disposed in the curved part 305 for connecting the first and second members. If the curved part 305 is formed by the same thickness as the first and second members, a stiffness higher than that of the plane-like portion 303b of the first member 303 due to the configuration of curve and a small area.

Accordingly, since a deformation in a direction of width of the vehicle in the plane-like portion 303b is difficult to generate, a shearing force acts on the instrument panel in a vertical direction to a plane in which the rupturable groove 301 is formed.

On the contrary, a shearing force acts on a region 308 (hatching portion in FIG. 16) of the instrument panel in the rightward and leftward directions at the vicinity of a border line 306 between the first member 303 and curved part 305 since the deformation of curved part is small as shown in FIG. 15.

Especially, as in the conventional instrument panel 300, if the rupture of the rupturable groove is carried out simultaneously or according to the sequence from No. 1 to No. 5 shown in FIG. 15, a direction of shearing force 309 acting on the rupturable groove changes in a direction shown in the arrow in FIG. 15 on the border of the border line 306.

Therefore, as shown in FIGS. 16 and 17, if a portion of the first member adjacent to the rupturable groove 301 is fixed by means of a fixed point 307, a crack 310 (see FIG. 17) tends to generate on the surface of the first member in rightward and leftward directions of the instrument panel. When the lid 302 is opened, a peeling part 311 tends to be formed on the surface of the first member as shown in FIG. 18. Such crack and peeling are easy to generate at a lower temperature (for example, minus 40° C.).

For this reason, if the rupturable groove is easy to rupture by thinning a thickness of the cover in the rupturable groove, at the time of forming the instrument panel, the forming of instrument panel is ineffectively since flowing of liquid synthetic resin is not good in the curbed part 305, and the formed instrument panel is subjected to generation of an upwardly and downwardly repeated resilient deformation in which the instrument panel deforms inwardly of the instrument panel and generates a depression when pressing the instrument panel from the above side.

An improvement is requested in the aforementioned conventional structure.

SUMMARY OF THE INVENTION

It is, therefore, an object of the present invention to provide a cover for an air bag in a vehicle, in which a rupturable groove is easy to rupture even at the corners thereof without generating any crack and which is difficult to generate deformation to the inner side of the cover even when pressing from the surface side thereof.

To accomplish the above object, the present invention is characterized in that a rupturable groove is formed in such a manner that it extends to coincide substantially with a direction of stress applied on a cover when the rupturable groove is ruptured.

More specifically, the cover according to the present invention comprises a first member and a second member connected with the first member.

The rupturable groove provided on a surface of the cover opposite to an airbag in order to rupture in response to an inflation of the air bag and to form an opening for causing the air bag to inflate.

The rupturable groove is formed throughout said first and second members in such a manner that it extends to coincide substantially with a direction of shearing force applied on the cover when the rupturable groove is ruptured.

In one example, the rupturable groove is formed to coincide substantially with a direction of shearing force acting outwardly on the plane-like portion in the right and left directions of the first member when transferring from the curved part of the second member to the plane-like portion of the first member.

The first member is disposed to extend forwardly and backwardly of a vehicle and said second member is connected with the backward end of the first member and extends curvedly downwardly of the vehicle.

Concretely, the rupturable groove comprises at least one first groove part formed to extend rightward and leftward on the second member, two parallel second groove parts formed to extend upwardly and downwardly on the first member and third curved groove parts formed to connect the first and second groove parts.

The third groove parts are formed in such a manner that connected portions thereof with said second groove parts are on the first member.

The rupturable groove has a fourth groove part for connecting mutually said second groove parts.

In one example, the rupturable groove is composed of a series of seamed holes.

In the other example, the rupturable groove is composed of a cutout groove.

In one embodiment, the cover is applied to an instrument panel.

In the other embodiment, the cover is applied to a interior trim member.

DETAILED DESCRIPTION OF THE PREFERRED EMBODIMENTS

One embodiment of a cover structure for an air bag device according to the present invention will be explained in connection with FIGS. 1 to 12 hereinafter.

Figure 1:
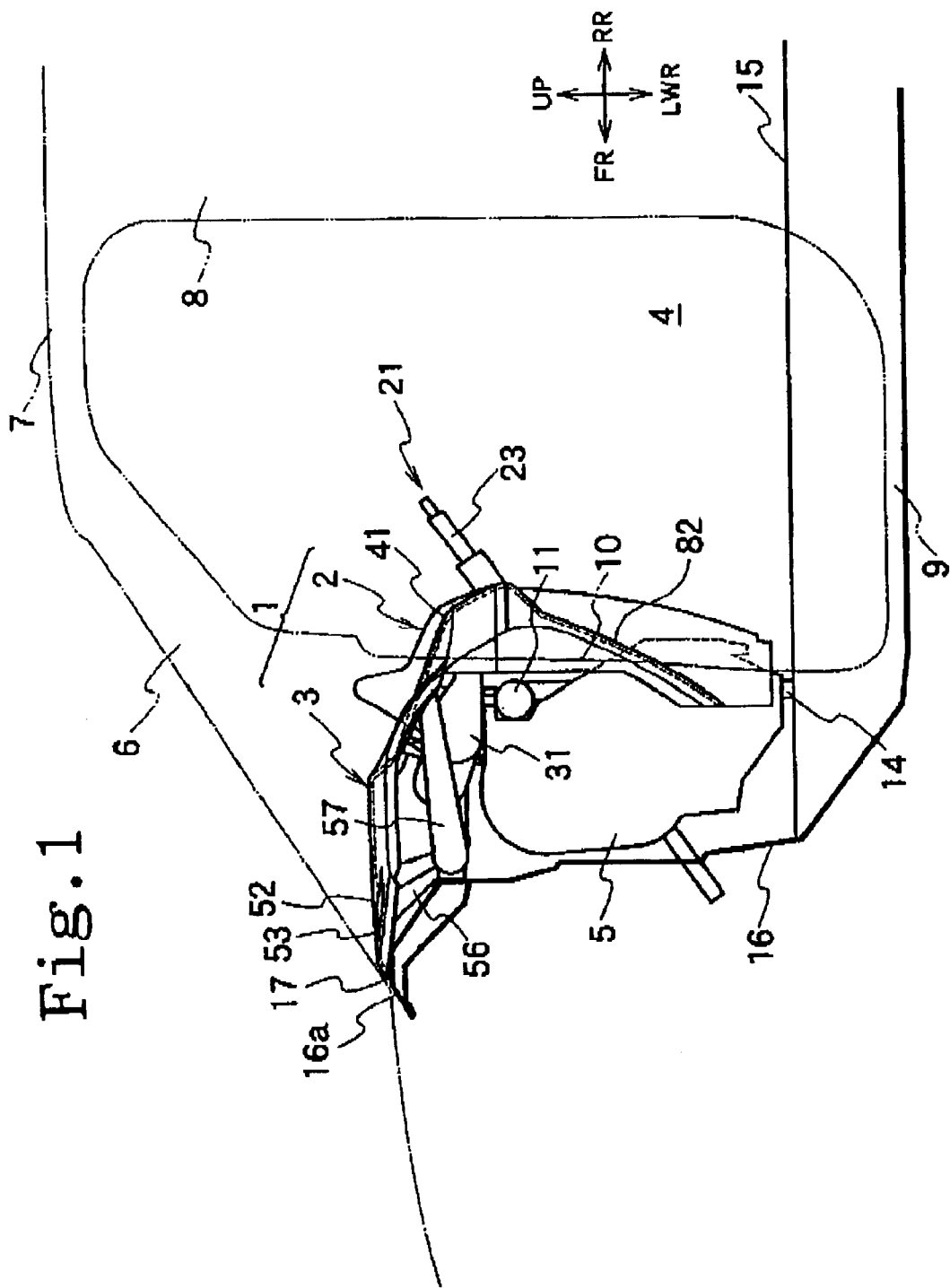
FIG. 1 is a side view showing a case of applying a cover structure for an air bag device according to one embodiment of the present invention to an instrument panel provided in a vehicle such as an automobile.
Figure 2:
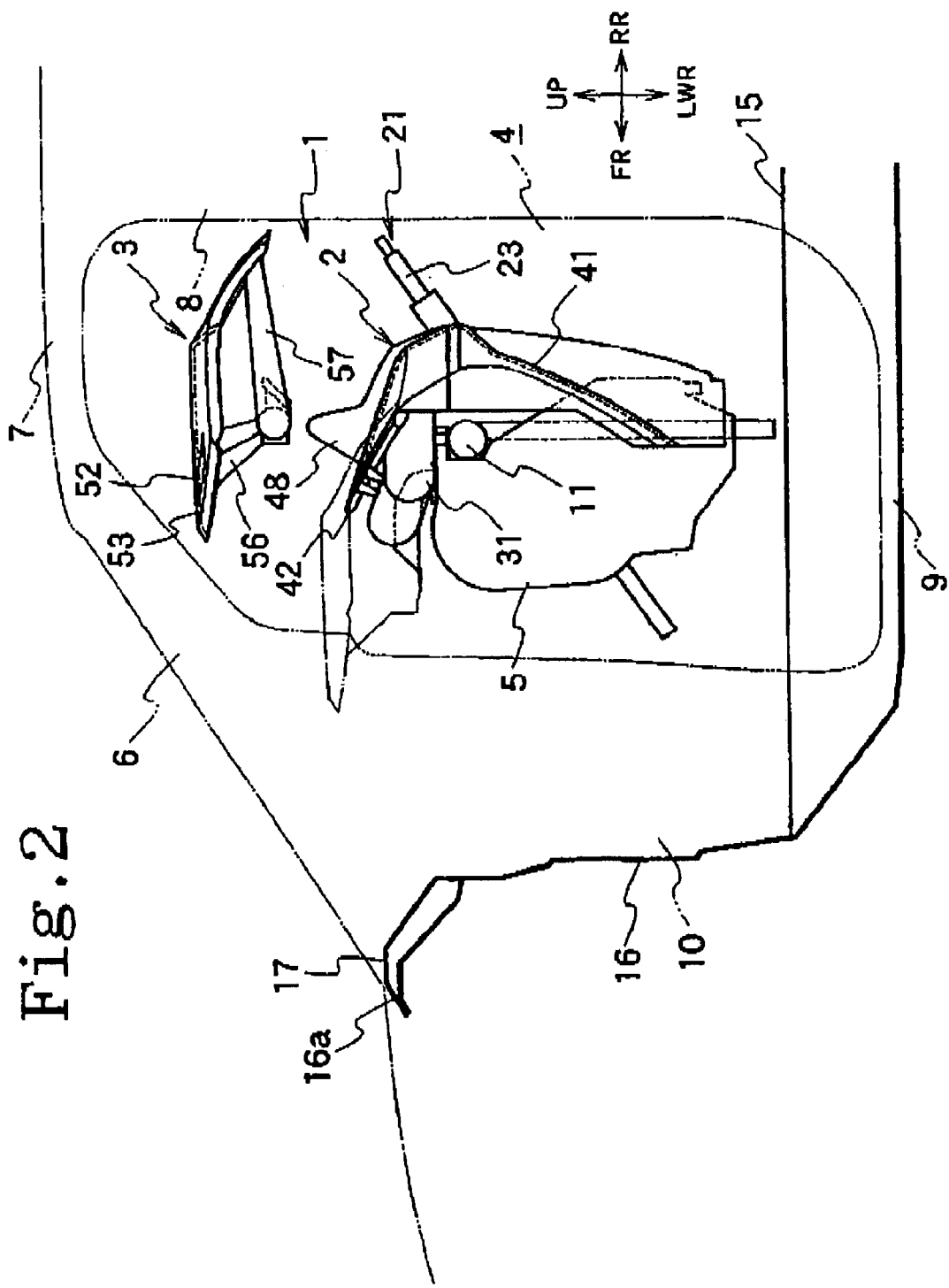
FIG. 2 is a side view of a portion of the vehicle showing a relationship between the instrument panel and a door opening.

Referring to FIG. 1, the cover structure according to the present invention is applied to an instrument panel 1 in a vehicle such as an automobile. The instrument panel is composed of a single layer.

Of course, the cover structure may be applied to a door panel, trim member or the like in the vehicle, for example.

In the embodiment, the instrument panel 1 is composed of a module instrument (hereinafter referred to as module inst) 2 and a garnish molding 3. In FIGS. 1 to 3 and 5, reference character UP denotes an upward side, reference character LWR a downward side, reference character FR a forward side and reference character RR a backward side, respectively.

A forward and backward width of an assembly of the module inst 2 and garnish molding 3 is large than that of each of door openings 4. The door openings 4 are formed in a vehicle body to open and close doors (not shown) which are well known. Each of the door openings 4 is formed by means of a front pillar 6, an upper side rail 7, a center pillar 8, a side sill 9 and a front pillar lower panel 10 as the vehicle body.

The module inst 2 is pre-assembled by a constitute 31 which is fixable to a steering member 11 and which is previously provided with auxiliary parts 21, an instrument upper panel 41 as a cover of synthetic resin such as PPC to cover the constitute 31 and an inst lower panel 82 which is disposed in the downward side LWR of the instrument upper panel 41 to cover a lower side of the constitute 31.

The entire forward and rearward width of the constitute 31, instrument upper panel 41 and inst lower panel 82 is less than that of each door opening 4.

The steering member 11 is formed in a hollow circular rod-like shape bridged between the front pillar lower panels 10 and 10.

Attached to the opposite ends 11a and 11b of the steering member 11 by welding are brackets 12 and 13 which are fastened on the front pillar lower panels 10 by bolts (not shown) and so on.

Reference numeral 14 denotes a stay which is fixed at its upper end to the steering member 11 and is fastened at its lower end on a tunnel 15 (see FIG. 1) of a floor in a vehicle body by means of a bolt or the like to support the steering member 11 from the downward side LWR.

Figure 5:
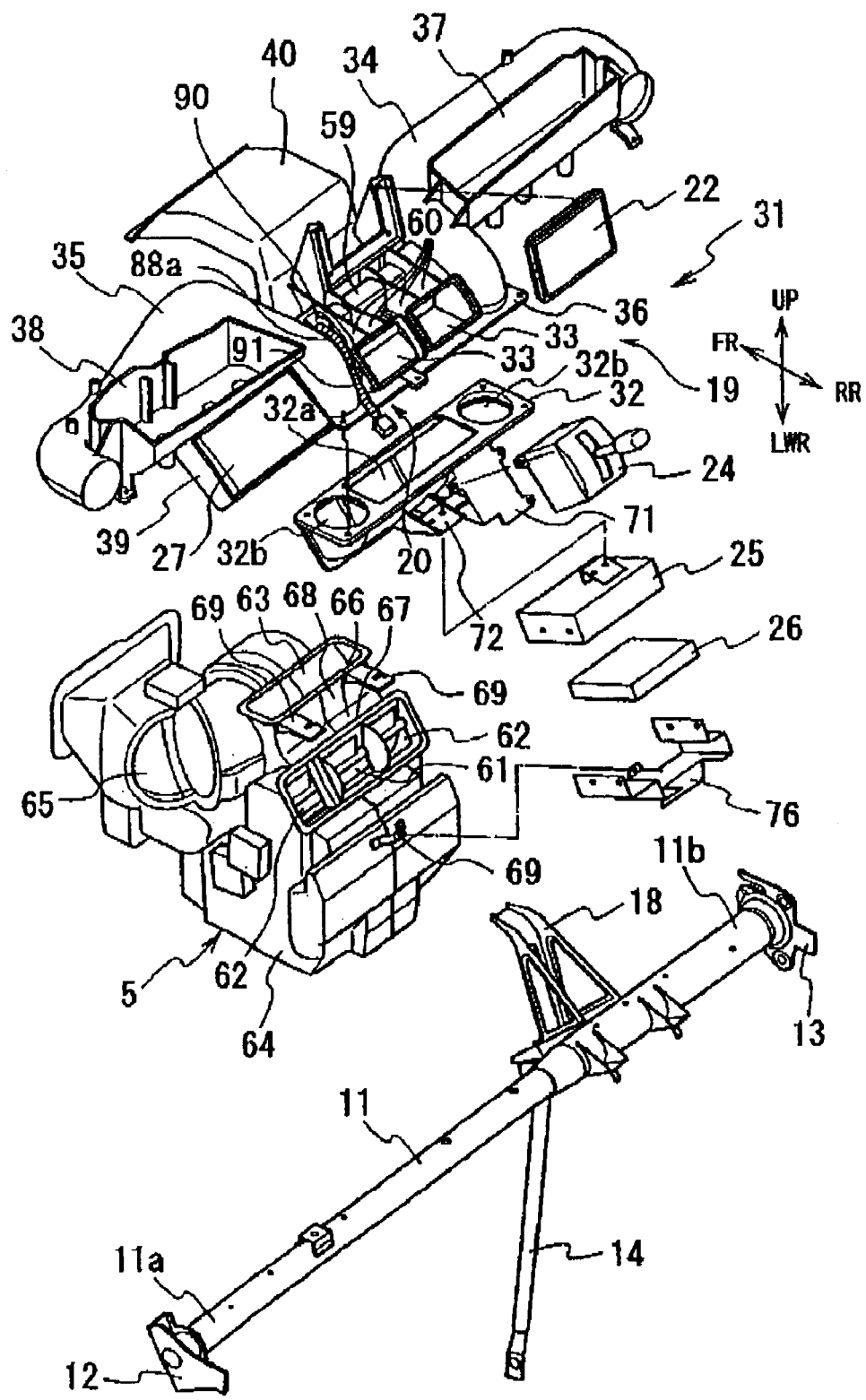
FIG. 5 is an exploded perspective view of FIG. 4.

As shown in FIG. 5, reference numeral 18 denotes a bracket for supporting the steering member 11 on an upper edge portion 16a of a cowl box 16 (well known) from the upward side UP.

The garnish molding 3 is detachably bridged between the a front end 42 of the instrument upper panel 41 in the module inst 2 and the upper edge portion 16a of the cowl box 16 to cover from the upward side UP.

More specifically, the front end 42 of the instrument upper panel 41 and upper edge portion 16a of the cowl box 16 are provided with a plurality of engaging portions 43 and 17, respectively. The garnish molding 3 is supported by bosses (not shown) for engaging with the engaging portions 43 and 17 of the cowl box. The engaging portions 43 and 17 are provided with spring-like stoppers (not shown) for holding the bosses.

The garnish molding 3 has a flat body 51 made of synthetic resin. A front end 52 in the forward side FR of the body 51 is formed with defroster nozzles 53. A back end 68 in the backward side RR of the body 51 is disposed to ride from the upward side UP on the front end 42 of the instrument panel 41. The backward side RR of each of the right and left opposite ends of the body 51 is provided with a projected member 54 which is formed with a side defroster nozzle 55 (see FIG. 3).

Figure 3:
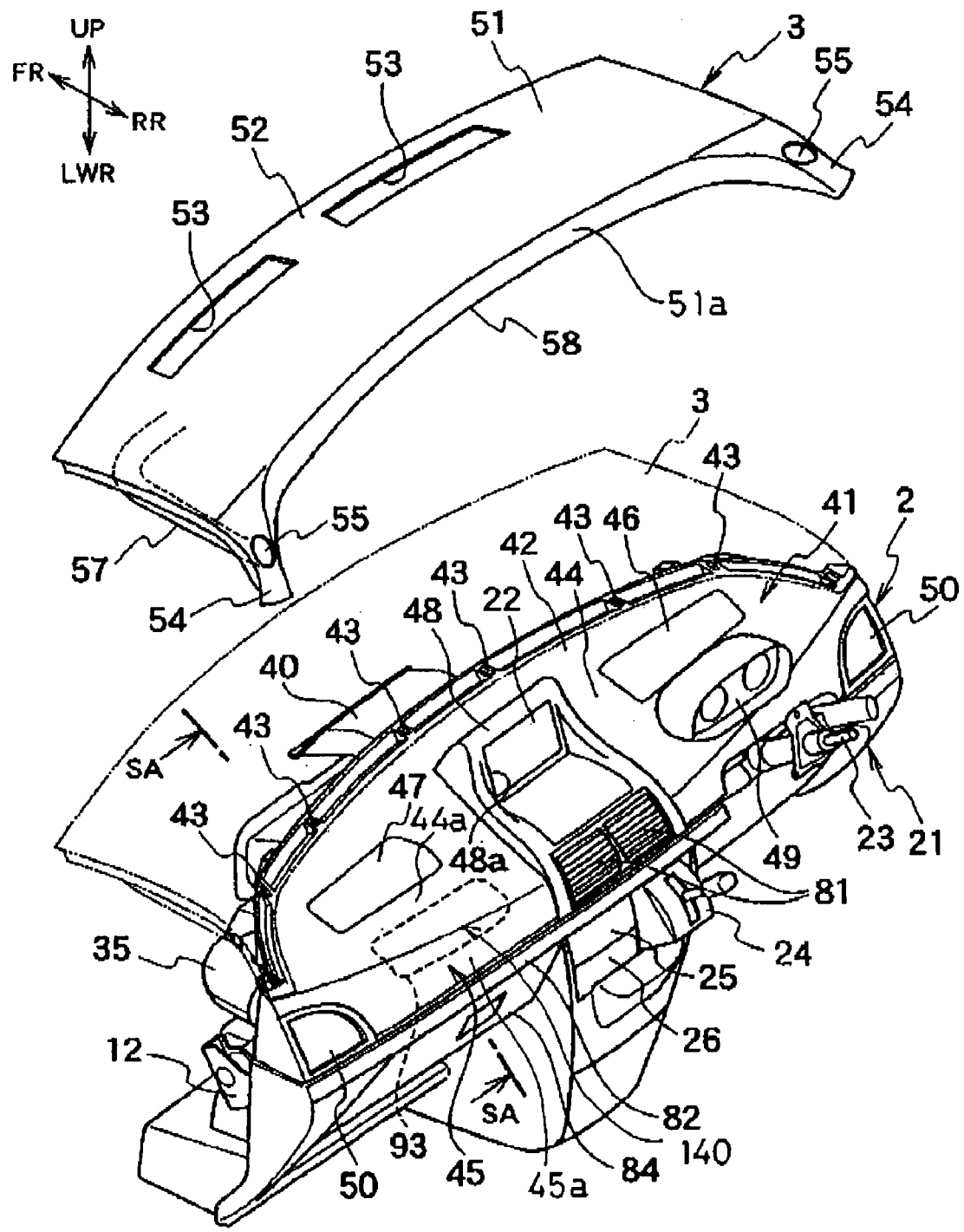
FIG. 3 is an exploded perspective view of the instrument panel shown in FIG. 1.

Front and side defroster nozzles 56 and 57 are provided on the back surface of the garnish molding 3 (see FIGS. 1 and 3). The front defroster nozzles 56 are communicated with the defroster nozzles 53 and side defroster nozzles 57 are communicated with the side defroster nozzles 55.

As needed, an electronic instrument such as a head up display unit, a head up display controller, a unit type of ETC antenna or the like may be attached on the back surface of the garnish molding 3.

Figure 4:
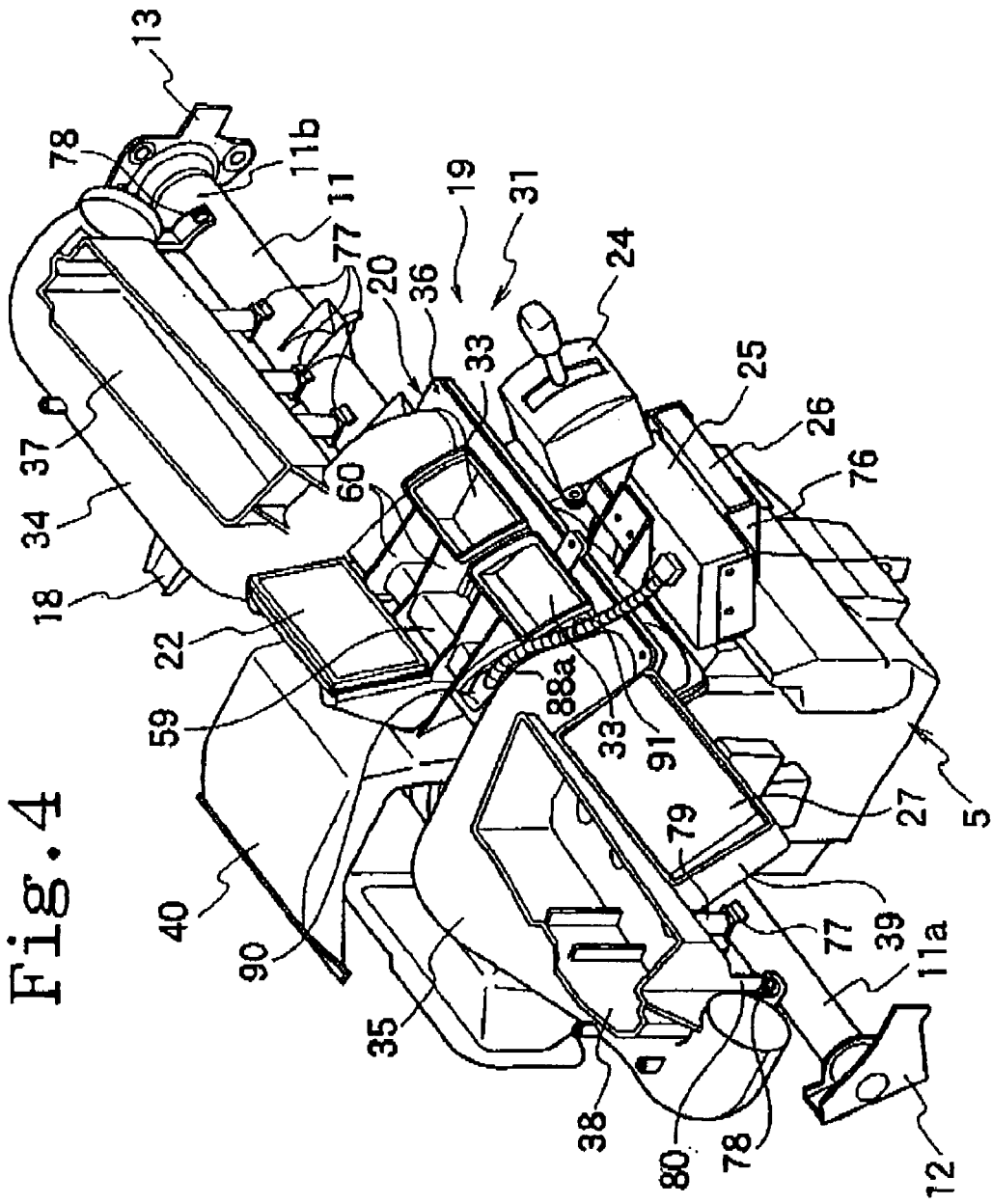
FIG. 4 is a perspective view showing a module inst shown in FIG. 3.

As shown in FIG. 4, the constitute 31 is integrally formed with an air conditioning duct body 19 which is made of synthetic resin and which is fixable to the steering member 11 and boxes 37 and 88 between which the air conditioning duct body 19 are disposed.

A steering column 23 is supported on the constitute 31. The air conditioning duct body 19 is composed of a connected part 20 connected with an air conditioning device 5 which is disposed in about the center between the right and left of the vehicle body and right and left duct bodies 34 and 35 extending rightward and leftward of the connected part 20.

As shown in FIG. 5, a seat 32 is connected at its lower portion with a center vent nozzle 61 of the air conditioning device 5, which is disposed at the center between the right and left of the vehicle body and right and left vent nozzles 62, 62. An upper central opening 32a and right and left openings 32b, 32b are connected with the vent nozzle 61 and 62, respectively.

Further, the connected part 20 is connected through the seat 32 and a connecting member 36 of the right and left duct bodies 34 and 35 with the central vent nozzle 61 and a central defroster nozzle 63 in the air conditioning device 5.

The central vent nozzles 33, 33 communicated with the central and right and left vent nozzles 61 and 62 in the air conditioning device 5, a reinforced member 59 bridged between the right and left duct bodies 34 and 35, a plurality of ribs 60 integrally formed forward of the central vent nozzle 33 and extended forward and backward of the reinforced member 59 and ventilation flue 40 which is communicated at its lower end through connecting member 36 with the central defroster nozzle 63 in the air conditioning device 5 and at its upper end with the front defroster nozzle 56, are integrally formed as shown in FIG. 5.

The reinforced member 59 is formed with through-hole 90 through which a branch line 88a (see FIG. 4) of a wire harness disposed on the back surface of the reinforced member 59 is led out in the front surface of the reinforced member.

On the other hand, the right and left duct bodies 34 and 35 are branched rightward and leftward after they are extended from the connected part 20 to the forward side FR.

The duct bodies are formed in about U-shape in such a manner that leading openings are disposed toward the backward side RR (the foreground). The right and left duct bodies 34 and 35 are adopted to hold the boxes 37 and 38 by forming integrally the forward side FR and a periphery of right and left sides of the boxes 37 and 38 with the duct bodies 34 and 85.

The reinforced member 59 of the connected part 20 is positioned in one line with the boxes 37 and 38 in a direction of width of the vehicle to enhance the stiffness of the connected part 20 in the direction of width of the vehicle. Further, the plurality of ribs 60 transverse to the reinforced member 59 is connected at its front end with a back wall of the ventilation flue 40 and at its back end with front walls of the central vent nozzles 33, 33, respectively, to enhance the bending stiffness of the connected part 20 in the forward and backward directions (see FIG. 5).

A container 39 for an air bag device 27 is integrally with the left box 38 in the backward side RR of the box (see FIG. 4). The air bag device 27 is contained in the container 39. The air bag device has an air bag which is folded and contained in the container 39.

Figure 6:
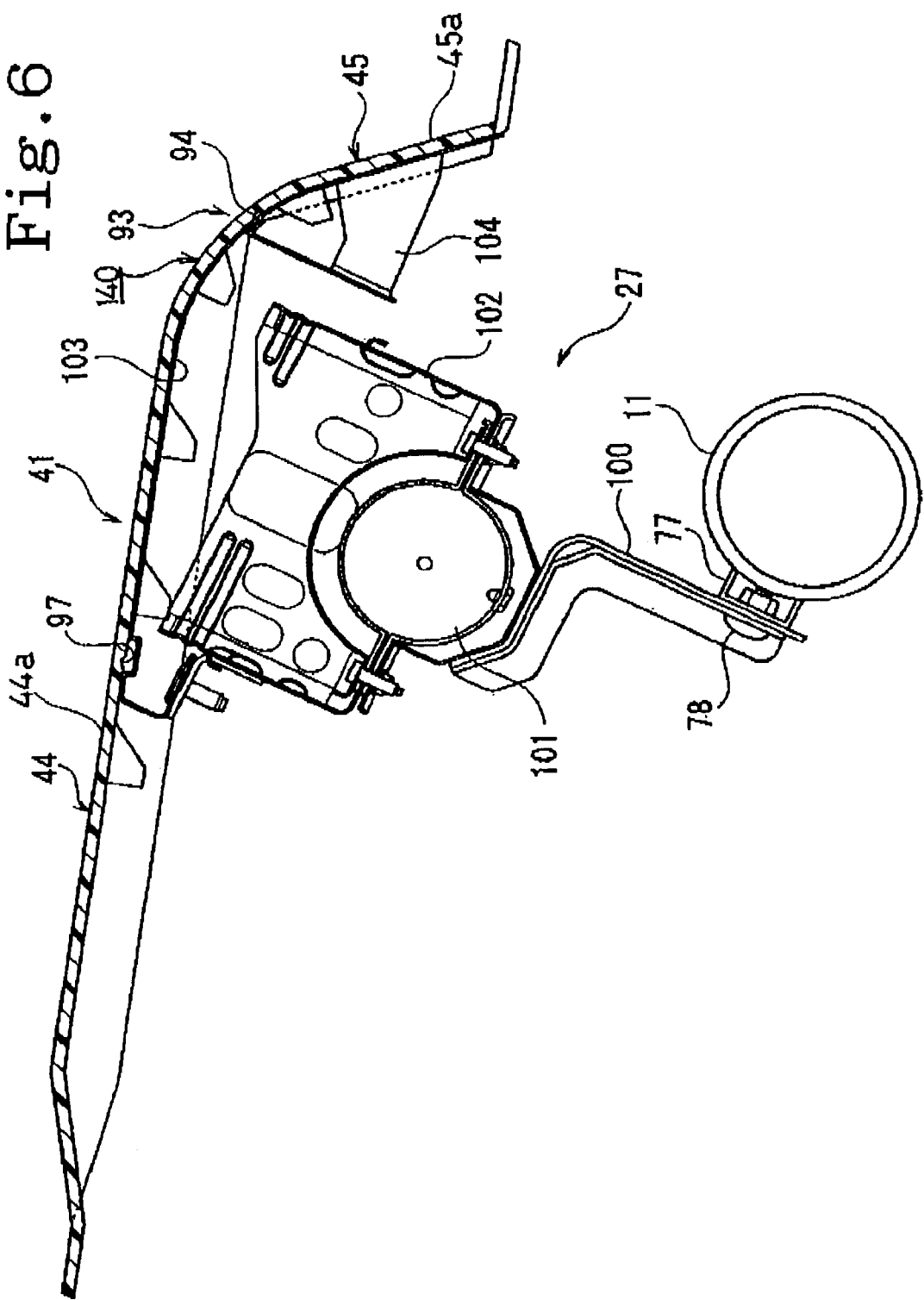
FIG. 6 is a sectional view taken along the line SA—SA in FIG. 3.
Figure 7:
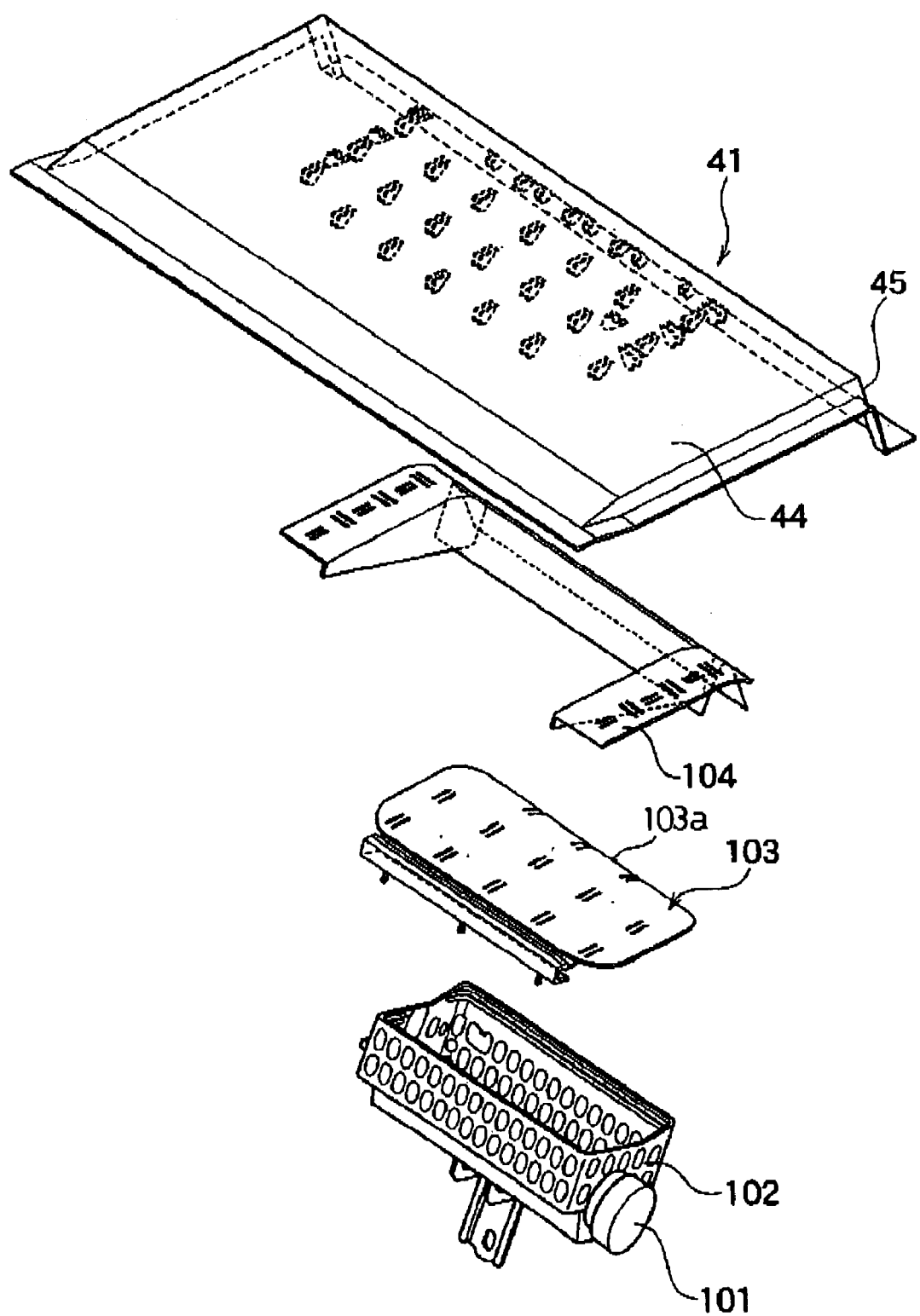
FIG. 7 is an exploded perspective view showing an air bag device shown in FIG. 6.

As shown in FIGS. 6 and 7 the air bag device 27 includes also air inflator 101 having a leg 100 which is attached through a bracket 77 to the steering member 11 by means of a screw 78.

The air bag is adapted to inflate by gas ejected from the inflator 101.

The air bag device 27 is provided with a mechanism for guiding the inflation of the air bag.

The mechanism has a box-like guide member 102, a plate 103 for reinforcing and anti-scattering and reinforcements 104.

The plate 103 is made of iron plate having thickness of 0.6 mm and the reinforcements 104 are disposed at the periphery of the plate.

The reinforcements 104 are disposed to support almost the entire periphery of a rupturable opening 93 as will be described hereinafter.

When a sensor (not shown) detects collision or the like of the vehicle, the inflator 101 ejects gas to inflate the air bag.

The container 39 can contain the guide member 102 in the inside of the instrument upper panel 41.

In addition, a free end 103a of the plate 103 is formed with a hem (folded part) to prevent the air bag of the air bag device 27 from rupturing.

Because the duct bodies 34 and 35 act as reinforced means, it is possible to enhance the stiffness of the front end 42 of the instrument upper panel 41 to fail to subject to any influence when fitting the garnish molding 3 from the upward side UP.

The duct bodies 34, 35 also are supported by means of attached pieces 79 mounted on the brackets 77 which are fixed to the upper portion of the steering member 11 by welding, or attached pieces 80 which are fixed directly on the upper portion of the steering member 11 by means of screws 78.

Figure 8:
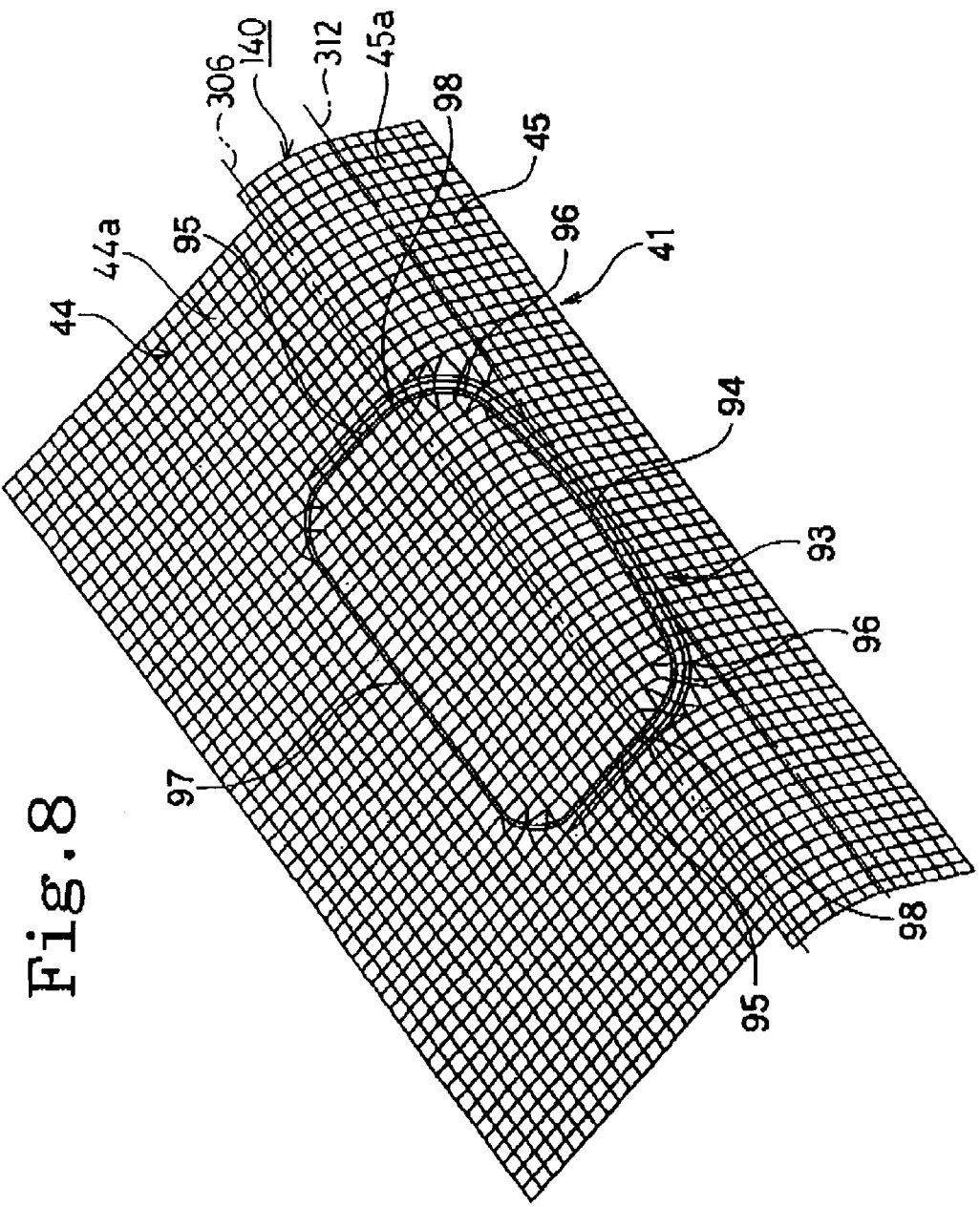
FIG. 8 is a perspective view showing schematically a rupturable groove in the cover.

The instrument upper panel 41 has a uniform thickness of average 3 mm. The instrument upper panel 41 includes a first member 44 disposed in an upper position and a second member 45 which is disposed in a position lower than the first member and which is connected through a curved part 140 with the first member 44 as shown in FIGS. 3 and 8.

The first member 44 has a plan or plane-like portion 44a. The second member 45 has a vertical portion 45a connected at about perpendicular angle to the first member 44. Alternatively, the vertical portion 45a may be connected at any angle with second member 45.

It is noted that the vertical portion 45a is opposed to an occupant in the vehicle.

The first member 44 is provided with lids 46 and 47 for opening and closing openings of the boxes 37 and 38, a monitor storage 48 containing a center monitor 22 of a navigation, character communication or the like in the auxiliary parts 21, and a meter 49 disposed in the backward side RR of the lid 46 (this side in FIG. 3). The monitor storage 48 has an opening 48a for exposing the center monitor 22.

The second member 45 is provided with right and left openings 50, 50 for communicating with right and left openings of the duct bodies 34 and 35.

It is noted that the instrument upper panel 41 is provided with at its back surface a rupturable groove 93 which is formed throughout the first and second members 44 and 45 disposed to oppose to the opening of the container 39 in which the air bag is contained and which is always closed to rupture and open by inflation of the air bag.

The rupturable groove is formed to extend coinciding with a direction or stress applied to the instrument panel as shown in FIGS. 3 and 8.

More specifically, the rupturable groove 93 includes a first groove part 94 which extends horizontally and rightward and leftward of the vehicle on the vertical portion 45a of the second member 45, second groove parts 95 which are parallel to each other and which extend forwardly and backwardly of the vehicle on the plane-like portion 44a of the first member 44 and third groove parts 96 which extend curvedly from the first groove part 94 to the second groove parts 95.

Incidentally, a fourth groove part 97 may be formed to connect a front end of each of the second groove parts 95, in the forward side FR.

The rupturable groove 93 is set in such a manner that the first groove part or second groove parts are ruptured when the air bag is inflated and the curved third groove parts transfer the rupture from the first groove part 94 or the second groove parts 95 to the other. In other words, the rupturable groove is formed in such a manner that a shearing force applied to the instrument panel when the air bag is inflated acts along the first to third groove parts 94 to 96. This is accomplished by an arrangement of the first to third groove parts as described hereinafter.

The third groove parts 96 extend from the first groove part 94 to the second groove parts 95 so that connected portions of the third groove parts 96 with the second groove parts 95 are on the plane-like portion 44a of the first member 44.

In the embodiment, the rupturable groove 93 is composed of a series of seamed holes processed after injection molding of the instrument panel is carried out. The seamed holes are formed from non through-holes in the embodiment, namely depressions on the back surface of the instrument panel. Alternatively, the rupturable groove may be composed of a cutout groove such as V-shape or a half circle in section.

With respect to the first to third groove parts 94 to 96, the first groove part 94 has a sooth curve of the radius R1=1000 mm, for example, on a center which is disposed in the vicinity of the fourth groove part 97.

The second groove parts 95 are formed to extend straightly from the forward side FR to the backward side RR of the vehicle.

The back end of each of the second groove parts has a circular arc of the radius R2=150 mm, for example and connects with each of the third groove parts.

In the embodiment, the second groove parts are formed to extend from the curved part 140 of the second member 45 to the plane-like portion of the first member 44.

Each of the third groove parts 96 has a circular arc of the radius of R3=40 mm, for example and is connected smoothly with each of the first and second groove parts 94 and 95. Note that the radii R1, R2 and R3 as described above are set to being R1>R2>R3.

The air conditioning device 5 comprises a housing 64 containing a well known air temperature adjusting means such as an evaporator, a heater, the central and right and left vent nozzles 61 and 62 disposed in the upward and backward sides UP and RR of the housing 64 and the central defroster nozzle 68 disposed in the upward side UP of the housing 64 (see FIG. 5).

In FIG. 5, reference numeral 65 denotes an intake for air which is shown in FIG. 5 in an opened state.

Reference numeral 66 denotes a concave portion fitting the steering member 11 from the downward side LWR. The concave portion 66 surrounds the upward side UP of the steering member 11 together with upstanding walls 67 and 68 defined by the central and right and left vent nozzles 61 and 62 and central defroster nozzle 63 and brackets 69, 69 projected from the upstanding wall 68 of the central defroster nozzle 63.

The backward side RR of the seat 32 is integrally formed with first and second supporting members 71 and 72. An operating means 24 capable of operating an automatic transmission (well known) which is one of the auxiliary parts 21 is supported on the first supporting member 71.

An audio 25 and a communicating instrument 26 which are ones of the auxiliary parts 21 are supported on the seat 32 between the second supporting member 72 and bracket 69 supported on the surface of the backward side RR of the housing 64 by means of supporting means 76.

As the auxiliary parts 21, there are a steering column 23 and the air bag device and so on, other than the parts as described above.

Subsequently, a method for mounting the module inst 2 on the vehicle will be explained hereinafter.

First, the module inst 2 is supported on a jig (not shown). A forward and backward width of an assembly of the module inst and jig is set to be less than that of the door opening 4 and therefore the assembly can be inserted through the door opening 4 into the vehicle to attach the module inst 2 within the vehicle in position.

After the attachment of the module inst, the jig is transported out of the vehicle.

Next, the garnish molding 3 is attached to the engaging portion 43 of the front end 42 in the module inst 2 and engaging portion 17 of the upper edge 16a of the cowl box 16 to bridge from the upward side UP.

In the embodiment, the instrument panel and the others relating to it are constituted as described above.

Subsequently, an operation of the air bag device 27 will be explained hereinafter.

Figure 9:
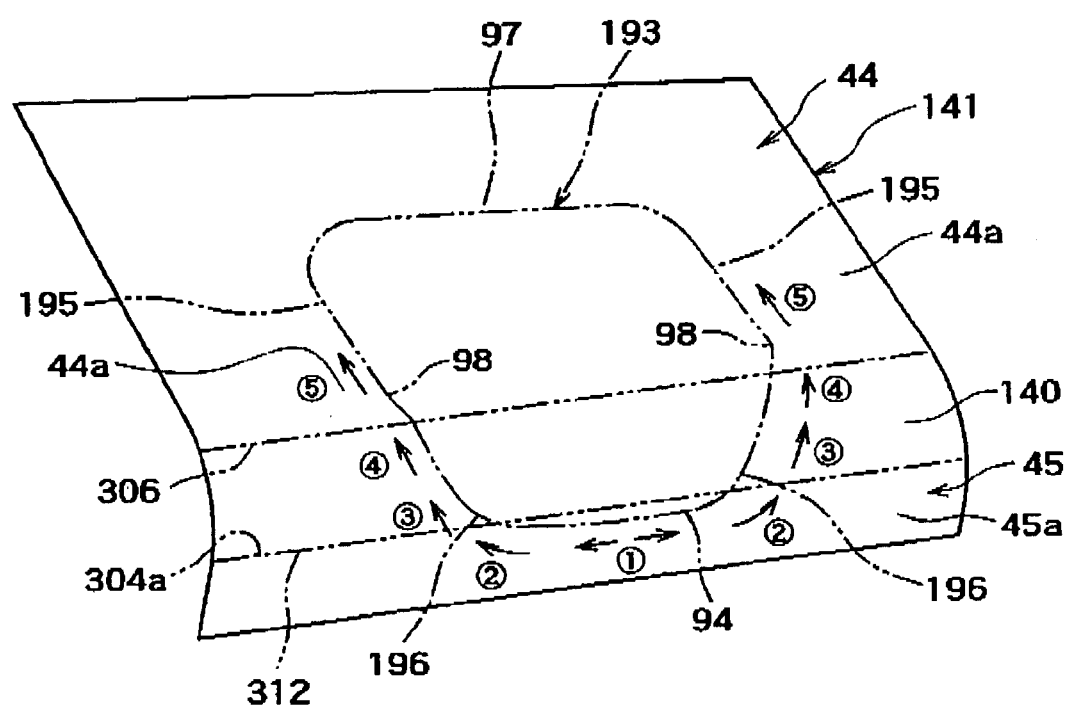
FIG. 9 is a perspective view for explaining a rupturable position of groove in the instrument panel.
Figure 15:
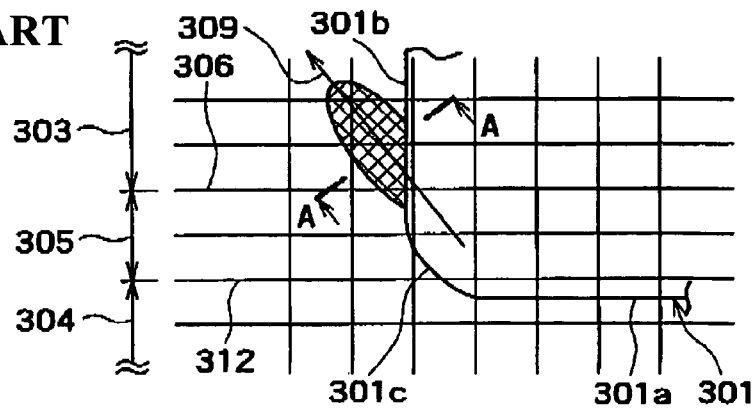
FIG. 15 is an exploded plan view for explaining a region of generating a stress on an instrument panel having a curved portion.

First, when the sensor detects a collision of vehicle or the like, the inflator 101 is ignited to eject gas. The air bag is inflated by the ejected gas while the guide member 102 guides the inflation of the air bag to cause the inflated air bag to abut with the back surface of the instrument panel 41 surrounded by the rupturable groove 93. As a result of the abutment of the air bag with the instrument panel, the first to third groove parts 94 to 96 or the fourth groove part 97 are ruptured simultaneously or according to the sequence showing from No. 1 to No. 5 as shown in FIG. 9. Consequently, a direction of shearing force 309 on the instrument panel 41 changes at the boundary between the first and second groove parts, as shown in FIG. 15.

Because the rupturable groove, specifically, the first to third groove parts are formed coinciding with the shearing force of rupturing the instrument panel at the rupturable groove, or along the shearing force applied on the plane-like portion 44a of the first member 44, even when a direction of the shearing force of rupturing the rupturable groove transfers from the curved portion 140 of the second member 45 to the plane-like portion 44a of the first member 44, the first groove part 94 through the third groove parts 96 to the second groove parts 95, the rupturable groove 93 can be ruptured smoothly along the first to third groove parts 94 to 96.

In other words, because the third groove parts are disposed at the corners having a relatively high stiffness and at the connected portions of the first groove part with the second groove parts to connect smoothly the first groove part with the second groove parts, even if a shearing force of rupturing the rupturable groove acts on a region deviated from the first and second groove parts to generate a crack on the instrument panel, the shearing force acts along the first to third groove parts to rupture only the rupturable groove without generating such a crack at the connected portions of the first and second groove parts.

Accordingly, thickness of the instrument panel in the rupturable groove may not be eliminated and therefore the thickness of the instrument panel is uniform in all portions, horizontal and vertical portions and so on. As a result, at the time of forming the instrument panel, flowing of liquid synthetic resin becomes smooth to perform a good forming.

The thickness of the instrument panel is average 3 mm, for example. The plan or plane-like portion 44a has a required stiffness without subjecting to a resilient deformation of the instrument panel, which easily generates when a force is applied to the instrument panel.

It is possible to rupture easily the rupturable groove without thinning the thickness of the instrument upper panel 41 in the rupturable groove 93 since the rupturable groove is formed along the direction of the shearing force applied on the instrument panel throughout the first and second members 44 and 45 when rupturing of the rupturable groove.

Further, any crack does not generate in the corners, namely, the connected portions of the first and second groove parts, even in a low temperature of minus 40° C. when the rupturable groove is ruptured.

Because the connected portions of the third groove parts 96 with the second groove parts 95 are positioned on the plane-like portion 44a of the first member 44, a curved line having the radius R2 of the backward side RR of each of the second groove parts 95 which constitute corners of the rupturable groove 93 is smoothly formed to bridge from the curved part 140 to the plane-like portion 44a of the first member 44.

Consequently, the flowing of the liquid synthetic resin can be further smoothly performed when forming the instrument panel.

It is possible to firmly rupture the rupturable groove an excessive load being added on the third groove parts 96 and without generating any crack on the periphery of the third groove parts.

Further, in the embodiment, because the seams are formed on the first and second members in the instrument panel to form the rupturable groove, after the instrument panel is formed, there is no any resistance in an injection molding when the first and second members 44 and 45 are formed.

Accordingly, it is possible to smoothly carry out the flowing of liquid synthetic resin to obtain a good forming. It is also possible to enhance the strength of the air conditioning duct body 19 by integrally forming the right and left duct bodies 34 and 35 with the boxes 37 and 38 with the duct bodies surrounding the boxes.

Further, the instrument panel 1 may be composed of two parts, the instrument upper panel 41 as a garnish member and the air conditioning duct body 19 as a framework, thus providing a lightweight and simple instrument panel.

Because the right and left duct bodies 34 and 35 of the air conditioning duct body 19 are connected with the connected portion 20 which in turn is connected with the air conditioning device 5, it is possible to sufficiently enhance the strength of the air conditioning duct body 19, especially, the right and left duct bodies. In this way, since the strength of the air conditioning duct body 19 is increased greatly, various auxiliary parts 21 can be firmly supported regardless of the constitute 31 of synthetic resin.

Because the connected portion 20 is formed in a lattice state from the connecting member 36 connected with the air conditioning device 6, reinforced member 59 and ribs 60, the strength of the connected part 20 is greatly increased. Any member for adding this strength is not required and therefore the cost of production is low.

Because the right and left duct bodies 34 and 35 of the air conditioning duct body 19 are supported on the upper portion of the steering member 11 by means of the attaching pieces 79 and 80, it is possible to temporally hold the right and left duct bodies 34 and 35 only by riding the them on the upper portion of the steering member 11 to increase the stability of the right and left duct bodies 34 and 35.

Before the module inst 2 is assembled in the vehicle, since there is only the module inst 2 which is small than the door opening 4, it is possible to insert the instrument panel 1 through the door opening 4 into a room in the vehicle.

The garnish molding 3 is bridged detachably between the front end 42 of the instrument upper panel 41 and the upper edge 16a of the cowl box 16. As a result, in a case that a repair on any part in the vehicle is needed after the instrument panel is mounted on the vehicle body, it is possible to carry out the repair of portion to be repaired without removing the instrument panel 1, or the instrument upper panel 41 since the back side of the instrument upper panel 41 and the vehicle forward part of the module inst 2 are exposed only by removing the garnish molding 3. In this way, the workability of repair can be increased.

Because the defroster nozzles 53 and 55 are formed on one garnish molding 3, the other parts are not required and therefore the cost of production is inexpensive.

As shown in FIG. 3, the back end 51a of the body 51 of the garnish molding 3 is arranged to cover the front end 42 of the instrument upper panel 41 of the module inst 2 from the upward side UP, it is possible to attach the body 51 of the garnish molding 3 to the instrument upper panel 41 from the upper side UP.

In a tone color design of the instrument panel 1, a combination of two tone colors (for example, the plane-like portion is a color which is difficult to reflect light and the vertical portion is a light color) is possible by separating the instrument upper panel 41 into the first member 44 having the plane-like portion 44a and second member 45 having the vertical portion 45a.

With a different configuration between the first and second members, various combinations are possible to carry out a common use among types of vehicle.

The first to third groove parts 94 to 96 of the rupturable groove 93 are not limited to the configuration as described above, for example, the first groove part 94 may be about straight line and each of the second groove parts 95 may be formed at its forward side FR in straight line toward the forward direction and at its back side RR in a circular arc of the radius of 150 mm. The third groove parts 96 may connect the first and second groove parts 94 and 95 with a circular arc of the radius of 40 mm.

In such a case, the direction to which the rupturable groove 93 extends, coincides with a direction to which a shearing force is applied when the rupturable groove is ruptured, a stress concentration is applied in the rupturable groove.

The first groove part 94 may be also formed on the vertical portion 45a of the second member 45 and on the curved part 140. The first groove part 94 may be also formed on a border line 312 between the vertical portion 45a of the second member 45 and the curved part 140 as shown by dotted lines in FIG. 8 or a portion of the first groove part may be formed on the border line or curved part and so on. In these cases, the same advantageous effects as described above can be obtained.

In this way, in the embodiment, it is possible to enhance the degree of freedom of setting the air bag device 27 since an opening for the air bag can be provided on the curved part 140 and so on.

FIGS. 9 to 12 illustrate the other embodiment of the instrument panel.

In the drawings, the same numerals are annexed to the same parts as in FIGS. 1 to 8.

In the embodiment, a rupturable groove 193 is formed on the back surface of an instrument upper panel 141 as cover member. The rupturable groove 193 extends to coincide with a direction of a stress or a shearing force applied on the instrument upper panel when the rupturable groove is ruptured. The rupturable groove 193 comprises the first groove part 94 formed horizontally on the vertical portion 45a of the second member 45, second groove parts 195, 196 which are parallel to each other and are formed to extend forwardly and backwardly on the plane-like portion 44a of the first member 44, and third groove parts 196 which are curved throughout the first and second groove parts 94 and 195.

Further, the fourth groove part 97 is formed to connect the front end of each of the second groove parts 195 as described above.

In the embodiment, the rupturable groove 193 is formed similarly as the rupturable groove 93 along the sharing force applied on the instrument panel when the rupturable groove is ruptured. Concretely, the third groove parts 196 extend to the plane-like portion 44a of the first member 44. The terminal points 98 of the second groove parts, in other words, the connected portions of the third groove parts with the second groove parts are disposed on the plane-like portion 44a of the first member 44.

Figure 10:
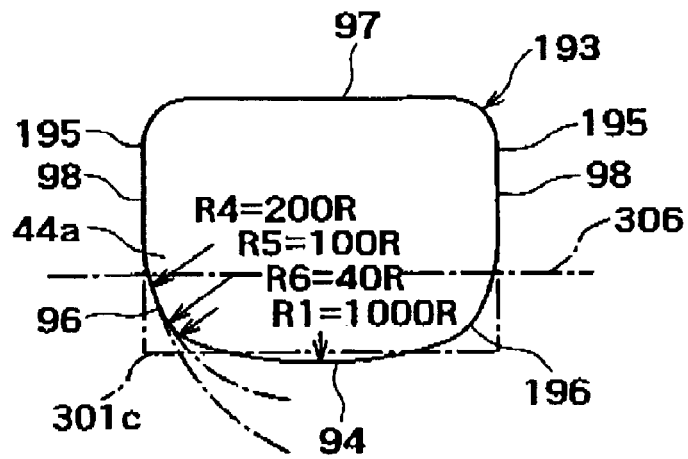
FIG. 10 is a top view for explaining a rupturable position of the groove the instrument panel.

As shown in FIG. 10, the second groove parts 195 are formed in straight line whose each backward end is a circular arc of the radius of R4, for example, 200 mm and is connected smoothly with each of the third groove parts 196.

In this embodiment, the second groove parts 195 are formed throughout the curved part 140 and plane-like portion 44a of the first member 44. Each of the third groove parts 196 has a first circular arc of the radius R5=100 R (100 mm) and a second circular arc of the radius R6=40 R (40 mm), connected with the first circular arc. The first circular arc is connected with the circular arc of each of the second groove parts and the second arc is connected with the first groove part 94.

Here, the aforementioned radii are not limited to the above numerals if they are set to being R4>R5>R6.

In the embodiment, the first groove part 94 has a circular arc having the curvature of the radius R1=1000R (1000 mm) and is connected smoothly with each circular arc of R6 in the third groove parts 196. Here, the above radii are set to being R1>R4>R5>R6.

As described above, the first to third groove parts are consisted by the radii and connected with respect each other and therefore the rupturable groove can be ruptured easily when it is opened by the inflation of the air bag for the following reason.

Next, an operation on the aforementioned structure will be explained below.

First, when the sensor detects a collision or the like, of the vehicle, the inflator 101 in the air bag device 27 is ignited to eject gas.

The air bag is then inflated by means of the ejected gas while the inflation is guided by the guide member 102 and abutted with the region of the instrument panel surrounded by the rupturable groove 193.

As a result of the abutment of the air bag with the instrument panel, the first to third groove parts 94, 196 and 195 or the fourth groove part 97 are ruptured simultaneously or according to the sequence showing from No.1 to No.5 as shown in FIG. 9.

Figure 11:
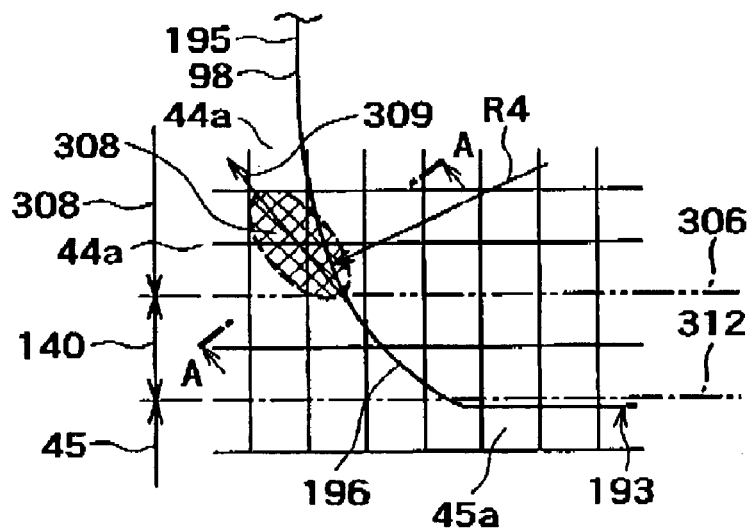
FIG. 11 is an exploded plan view for explaining the rupturable groove of the instrument panel.

Consequently, a direction of shearing force 309 on the instrument panel 41 changes at the boundary 306 between the first and second groove parts, as shown by the arrow in FIG. 11.

Because the rupturable groove, specifically, the first to third groove parts are formed coinciding with the shearing force of rupturing the instrument panel at the rupturable groove, or along the shearing force applied outwardly on the plane-like portion 44a of the first member 44 in the rightward and leftward directions, even when a direction of the shearing force of rupturing the rupturable groove transfers from the curved portion 140 of the second member 45 to the plane-like portion 44a of the first member 44, the first groove part 94 through the third groove parts 196 to the second groove parts 195, the rupturable groove 193 can be ruptured smoothly along the first to third groove parts 94 to 196.

In other words, because the third groove parts are disposed at the corners having a relatively high stiffness and at the connected portions of the first groove part with the second groove parts to connect smoothly the first groove part with the second groove parts, even if a shearing force of rupturing the rupturable groove acts on a region deviated from the first and second groove parts to generate a crack on the instrument panel, the shearing force acts along the first to third groove parts to rupture only the rupturable groove without generating such a crack at the connected portions of the first and second groove parts. In the above, a stress acts on the rupturable groove 195 along the region 308 to rupture the rupturable groove 195.

Figure 12:
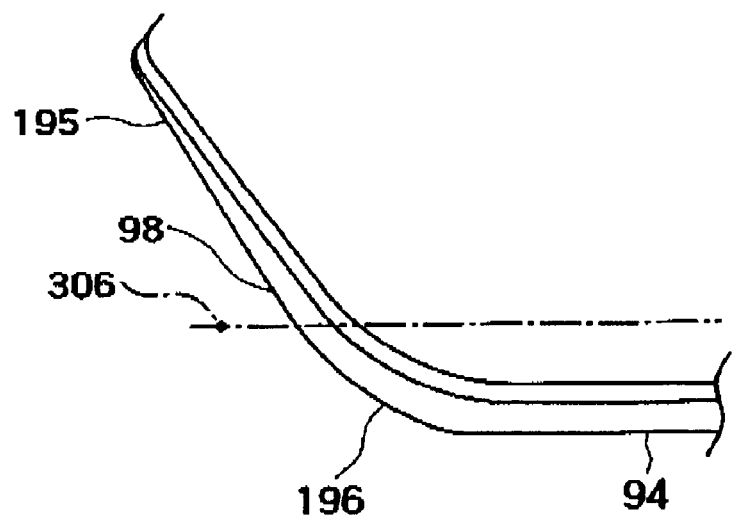
FIG. 12 is an exploded perspective view for explaining a state that an opening is formed.
Figure 13:
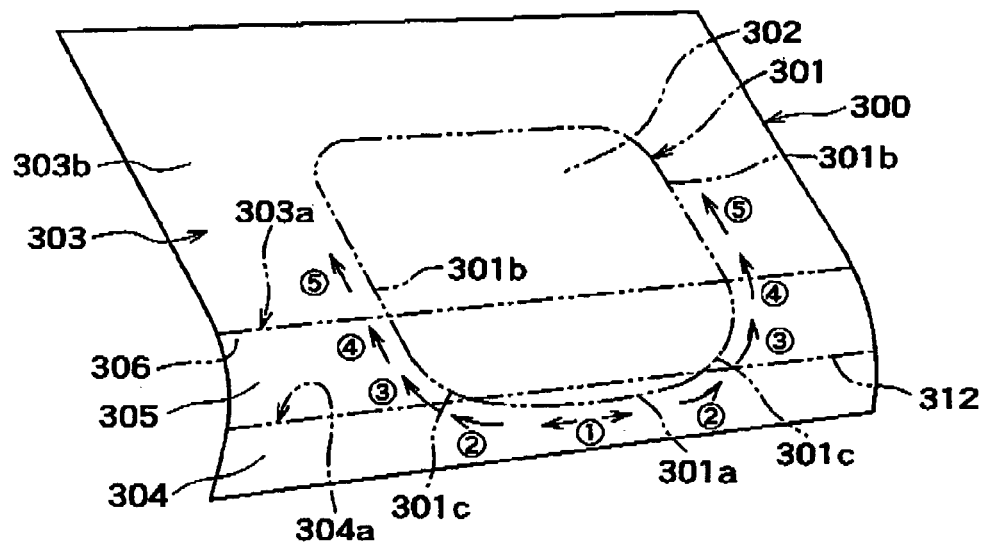
FIG. 13 is a perspective view for explaining a rupture of opening for the air bag device used in a usual instrument panel.
Figure 14:
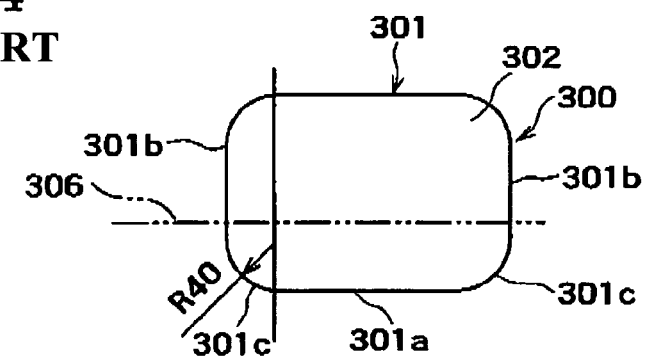
FIG. 14 is a top view for explaining an opening position of the usual instrument panel.
Figure 16:
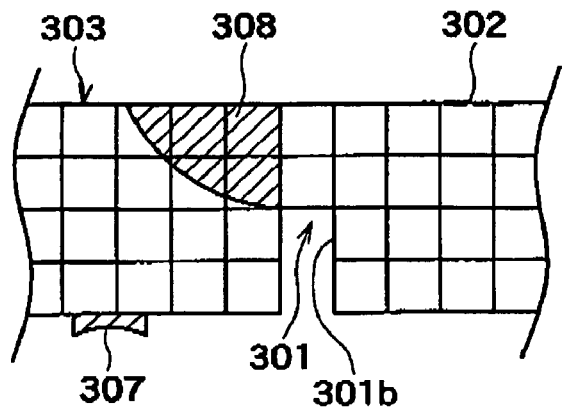
FIG. 16 is a sectional view taken along the line A—A in FIG. 15.
Figure 17:
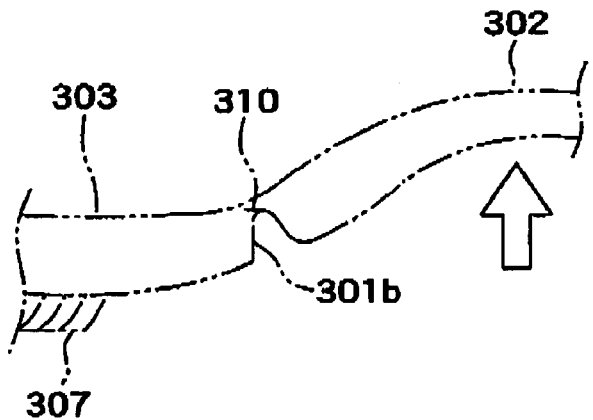
FIG. 17 is a schematic view corresponding to FIG. 16 for explaining a generation of crack in a flat part of the usual instrument panel.
Figure 18:
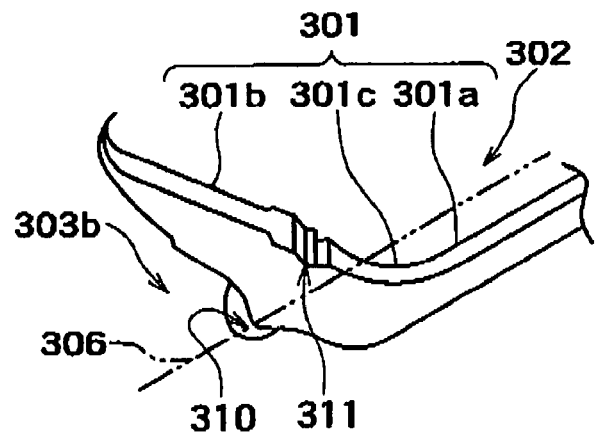
FIG. 18 is an exploded perspective view for explaining a surface peeling in the flat part of the usual instrument panel.

Accordingly, the third groove parts 196 which are corners of the rupturable groove are positioned on the curved part which has a high stiffness and therefore the rupturable groove can be firmly ruptured with an clear opening without generating any crack or peeling at the periphery thereof as shown in FIG. 12, even though the shearing force acts on the region 308 as shown in FIG. 16.

The other some structures and operation and advantageous effects can be accomplished in accordance with the concept of the present invention.

As described above, the cover structure for the air bag device according to the present invention has been explained in connection with the embodiment in which the cover structure is applied to the instrument panel in the vehicle, the present invention is not limited to the embodiment.

For example, the cover structure according to the present invention may be applied to an interior trim member mounted on the interior of the vehicle such as a front pillar, a center pillar, an upper side roof rail or the like. In addition, a good rupturing capability can be obtained in an air bag device for an pillar which has some limitation in production such as curved portions having small curvatures.

Further, it is not necessary to connect the second member perpendicularly to the first member, it may be connected with the first member at any angle by means of a curved portion.

This application claims priority from Japanese Patent Application 2002-097842, filed Mar. 29, 2002, and Japanese Patent Application 2003-083818, filed Mar. 25, 2003, both of which are incorporated herein by reference in their entirety.

What is claimed is:

1. A cover structure for an air bag device comprising:
a cover including a first member having a plane-like portion and a second member having a vertical portion connected through a curved part with said plane-like portion; and
a rupturable groove formed on a surface of said cover opposite to an air bag in said air bag device, said rupturable groove configured to rupture in response to inflation of the air bag and to thereby form an opening to expose the air bag, wherein said rupturable groove comprises at least, a first groove part formed to extend rightward and leftward on the second member, second groove parts formed to extend forwardly and backwardly on the first member and third groove parts formed to connect the first and second groove parts, wherein each of said first, second and third groove parts includes a circular arc having a radius different from each other to be formed smoothly throughout said first and second members, wherein said third groove part includes a plurality of circular arcs each having a radius different from each other to connect the first and second groove parts, such that said rupturable groove extends to coincide substantially with a direction of shearing force applied on the cover when the rupturable groove is ruptured, and wherein the radius of the circular arc in the second groove is larger than the radius of the circular arcs in the third groove.

2. A cover structure for an air bag device according to claim 1, wherein said rupturable groove is formed to coincide substantially with a direction of shearing force acting outwardly on the plane-like portion in the right and left directions of the first member when transferring from the curved part of the second member to the plane-like portion of the first member.

3. A cover structure for an air bag device according to claim 1, wherein said first member is disposed to extend forwardly and backwardly of a vehicle and said second member is connected with the backward end of the first member and extends curvedly downwardly of the vehicle.

4. A cover structure for an air bag device according to claim 1, wherein said third groove parts are formed in such a manner that connected portions thereof with said second groove parts are on the first member.

5. A cover structure for an air bag device according to claim 1, wherein said rupturable groove has a fourth groove part for connecting mutually said second groove parts.

6. A cover structure for an air bag device according to claim 1, wherein said rupturable groove is composed of a series of seamed holes.

7. A cover structure for an air bag device according to claim 1, wherein said rupturable groove is composed of a cutout groove.

8. A cover structure for an air bag device according to claim 1, wherein said cover is applied to an instrument panel.

9. A cover structure for an air bag device according to claim 1, wherein said cover is applied to an interior trim member.

10. A cover structure for an air bag device according to claim 4, wherein said rupturable groove is composed of a series of seamed holes.

11. A cover structure for an air bag device according to claim 4, wherein said rupturable groove is composed of a cutout groove.

12. A cover structure for an air bag device according to claim 4, wherein said cover is applied to an instrument panel.

13. A cover structure for an air bag device according to claim 4, wherein said cover is applied to an interior trim member.

14. A cover structure for an air bag device comprising:
a cover including a first member having a plane-like portion and a second member having a vertical portion connected through a curved part with said plane-like portion; and a rupturable groove formed on a surface of said cover opposite to an air bag in said air bag device, said rupturable groove configured to rupture in response to inflation of the air bag and to thereby form an opening to expose the air bag, wherein said rupturable groove comprises at least, a first groove part formed to extend rightward and leftward on the second member, second groove parts formed to extend forwardly and backwardly on the first member, and third groove parts formed to connect the first and second groove parts, and wherein each of said first, second and third groove parts includes a circular arc having a radius different from each other, wherein said third groove part includes a plurality of circular arcs each having a radius different from each other to connect the first and second groove parts, and wherein the radius of the circular arc in the second groove is larger than the radius of the circular arcs in the third groove.

15. A cover structure for an air bag device according to claim 14, wherein said rupturable groove is formed to coincide substantially with a direction of shearing force acting outwardly on the plane-like portion in the right and left directions of the first member when transferring from the curved part of the second member to the plane-like portion of the first member.

16. A cover structure for an air bag device according to claim 14, wherein said first member is disposed to extend forwardly and backwardly of a vehicle and said second member is connected with the backward end of the first member and extends curvedly downwardly of the vehicle.

17. A cover structure for an air bag device according to claim 14, wherein said third groove parts are formed in such a manner that connected portions thereof with said second groove parts are on the first member.

18. A cover structure for an air bag device according to claim 14, wherein said rupturable groove has a fourth groove part for connecting mutually said second groove parts.

19. A cover structure for an air bag device according to claim 14, wherein said rupturable groove is composed of a series of seamed holes.

20. A cover structure for an air bag device according to claim 14, wherein said rupturable groove is composed of a cutout groove.

21. A cover structure for an air bag device according to claim 14, wherein said cover is applied to an instrument panel.

22. A cover structure for an air bag device according to claim 14, wherein said cover is applied to an interior trim member.

23. A cover structure for an air bag device according to claim 17, wherein said rupturable groove is composed of a series of seamed holes.

24. A cover structure for an air bag device according to claim 17, wherein said rupturable groove is composed of a cutout groove.

25. A cover structure for an air bag device according to claim 17, wherein aid cover is applied to an instrument panel.

26. A cover structure for an air bag device according to claim 17, wherein said cover is applied to an interior trim member.

* * * * *